Jan. 7, 1947.　　　　G. P. WILLIAMS　　　　2,413,808
METHOD AND CAMERA FOR OBTAINING STEREOSCOPIC EFFECTS
Filed Sept. 1, 1944　　　　6 Sheets-Sheet 1

Inventor
George P. Williams.

By Clarence A. O'Brien
and Harvey B. Jackson
Attorneys

Jan. 7, 1947.  G. P. WILLIAMS  2,413,808
METHOD AND CAMERA FOR OBTAINING STEREOSCOPIC EFFECTS
Filed Sept. 1, 1944  6 Sheets-Sheet 2

Inventor
George P. Williams.

By *Clarence A. O'Brien*
and *Harvey B. Jacobson*
Attorneys

Jan. 7, 1947.　　　　G. P. WILLIAMS　　　　2,413,808
METHOD AND CAMERA FOR OBTAINING STEREOSCOPIC EFFECTS
Filed Sept. 1, 1944　　　　6 Sheets-Sheet 4

Inventor
George P. Williams

By Clarence A. O'Brien
and Harvey B. Jacobson
Attorneys

Jan. 7, 1947.  G. P. WILLIAMS  2,413,808
METHOD AND CAMERA FOR OBTAINING STEREOSCOPIC EFFECTS
Filed Sept. 1, 1944  6 Sheets-Sheet 5

Inventor
George P. Williams.

By Clarence A. O'Brien
and Harvey B. Jacobson
Attorneys

Jan. 7, 1947.    G. P. WILLIAMS    2,413,808
METHOD AND CAMERA FOR OBTAINING STEREOSCOPIC EFFECTS
Filed Sept. 1, 1944    6 Sheets-Sheet 6

Inventor
George P. Williams

By Clarence A. O'Brien
and Harvey B. Jackson
Attorneys

Patented Jan. 7, 1947

2,413,808

UNITED STATES PATENT OFFICE 2,413,808

METHOD AND CAMERA FOR OBTAINING STEREOSCOPIC EFFECTS

George P. Williams, Tampa, Fla.

Application September 1, 1944, Serial No. 552,269

9 Claims. (Cl. 88—16.6)

This invention relates to a method and to an apparatus for obtaining stereoscopic effects with monocular lenses, and it has for its general object to provide a new method of the type indicated which will not require a specialized reproduction equipment or method and which will produce a result more closely approximating the binocular stereoscopic effect than the monocular methods hitherto known.

It is a well known fact that the most objectionable feature of the binocular stereoscopic picture production methods—which permit to obtain optically perfect stereoscopic pictures—consists in the necessity of using special viewing or inspection apparatus, such as a binocular lens system, a lenticular stereoscopic apparatus, an apparatus with rotating blades, or with color compensating or polarizing screens which apparatus have to be supplied to each person viewing the picture individually as their effectiveness is based on different impressions transmitted to the two eyes.

This necessity of supplying specialized apparatus to the spectators proved to be an unsurmountable obstacle for large scale use of truly stereoscopic pictures.

Various methods have, therefore, been suggested to obtain stereoscopic effects or to accentuate the "depth" dimension of pictures which are, however, much less perfect than the binocular methods and frequently show only a slight improvement over those effects which may be obtained by adroit use of light and shadow.

These methods, as a rule, used special equipment or special cameras at the picture making end of the process, supplemented by a special equipment or special reproduction methods at the reproduction end, which were however of such a type that they were no longer individualized, but were inherent in the picture reproduced by these methods.

For instance, apparatus for superposing optically different projection pictures were used either for still projections or for movie pictures, or alternate projection of optically different pictures with a high frame velocity was resorted to in connection with moving pictures.

These methods have still the drawback of using in addition to a highly specialized picture production apparatus which is unavoidable, but not objectionable, a complicated and specialized equipment and correspondingly complicated methods at the reproduction end; although being less objectionable than the apparatus to be supplied individually they are nevertheless the source of difficulties as the number of consumers is always large and, therefore, organizational and economical factors play a prominent part.

Moreover, the stereoscopic effects which can be obtained by known non-binocular methods are as a rule not so marked to justify great investments.

It is, therefore, an object of the present invention to provide a method and means for producing stereoscopic effects which are a marked improvement over those usually produced by the methods hitherto known.

It is a further object of the invention to obtain these results by using solely specialized equipment at the picture producing end and by making the stereoscopic qualities inherent in the picture produced at said end so that no further step and no additional process at the reproducing end is necessary to complete or develop this effect.

A further object of the invention consists in providing a method and means which are equally applicable for still and for movie picture cameras and which are not tied to the use of the special optical equipment.

With these and other objects in view the method applied, when described in general, consists in making a picture, showing stereoscopic effects, while continuously changing the viewpoint from which it is taken during the exposure, said viewpoint being shifted over a distance which is sufficiently large to obtain stereoscopic effects and while, at the same time, and concurrently therewith, making a continuous series of successive linear partial exposures traveling over the entire width of the surface to be exposed, the speed with which the partial linear exposures succeed each other being in direct relation to the speed with which the viewpoint is shifted during said exposure.

Different parts of a picture made according to the method described, when inspected, will therefore reveal details which can only be seen from different viewpoints, such as the two eyes. However, in contradistinction to known methods, no superposition or blending of two complete pictures takes place and blurred pictures lacking in definitness are thus avoided. The definition of the picture made according to this invention is therefore, the same as that of non-stereoscopic pictures taken through the same aperture with the same type of lens.

The camera which is used will be described with reference to a specific modification which is intended to illustrate the invention; but it is to be understood that the invention consists in the underlying more general idea of using mechanical and optical means suitable for realizing the above explained principles. While the special mechanisms and components employed are to be considered as examples showing how the more general idea can be carried into effect, therefore the specification is rather to be regarded as merely illustrative of the method employed than as limitative or as restricting the scope of the invention to the examples shown.

The invention will be more readily understood when described with reference to the accompanying drawings, in which:

Figure 5 is an elevational sectional view, the section being taken along the line 3—3 of Figure 2, but the view being taken in the direction of the arrow 5, and showing part of the mechanism for moving the shutter.

Figure 2:
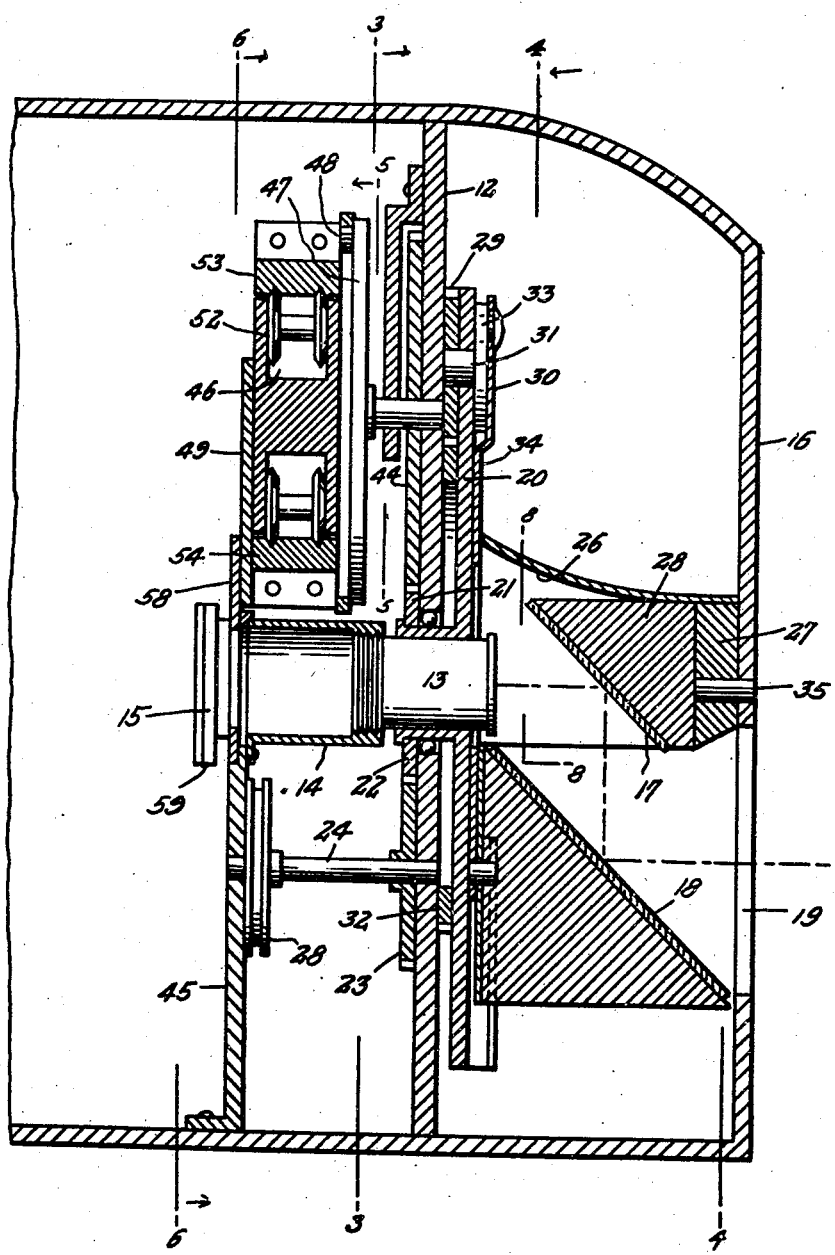
Figure 2 is an elevational view of a longitudinal cross section through a camera producing stereoscopic effects.
Figure 3:
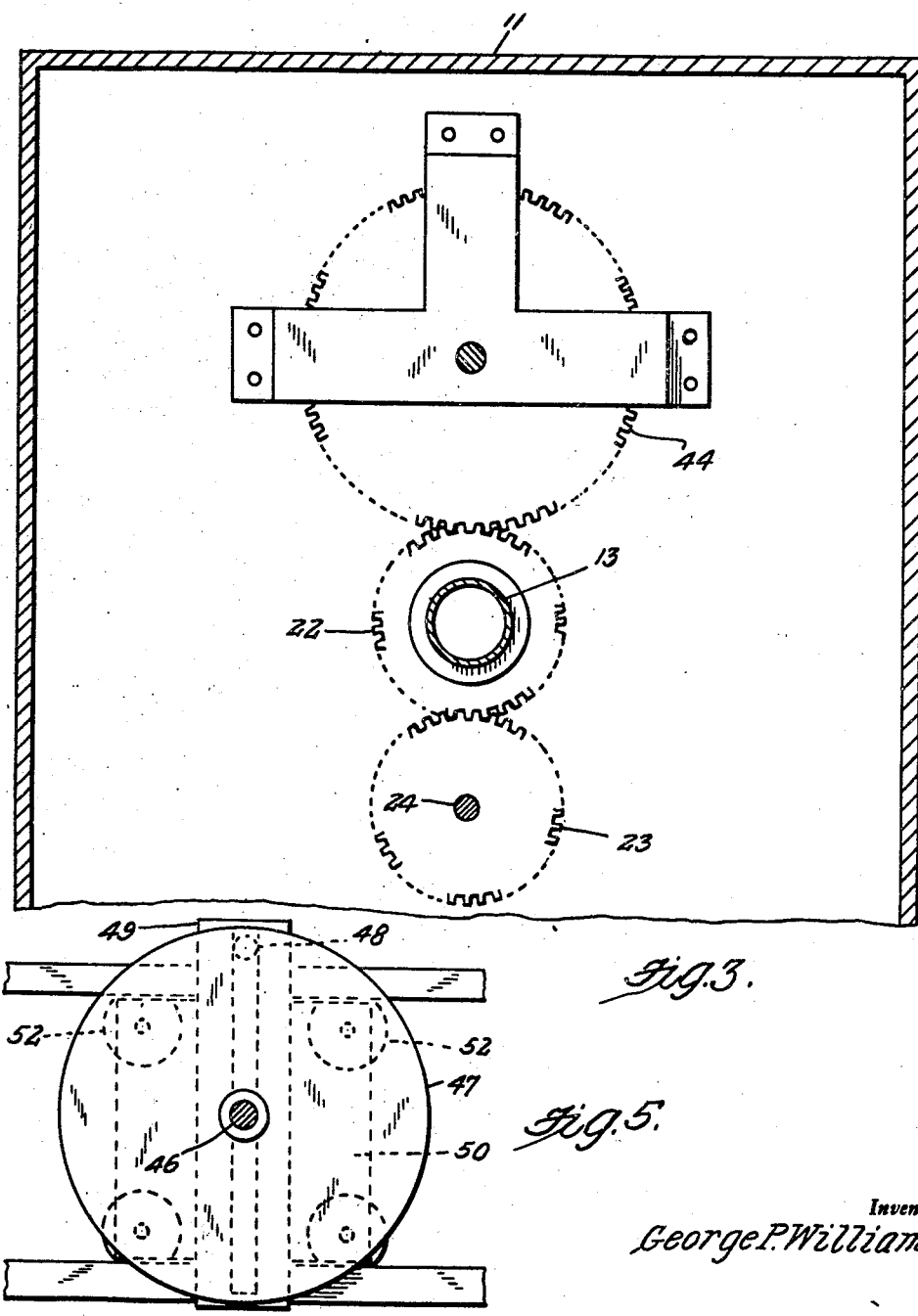
Figure 3 is an elevational sectional view through the camera the section being taken along line 3—3 of Figure 2, said view showing the rear part of the partition wall of said camera viewed in the direction of the arrow.
Figure 4:
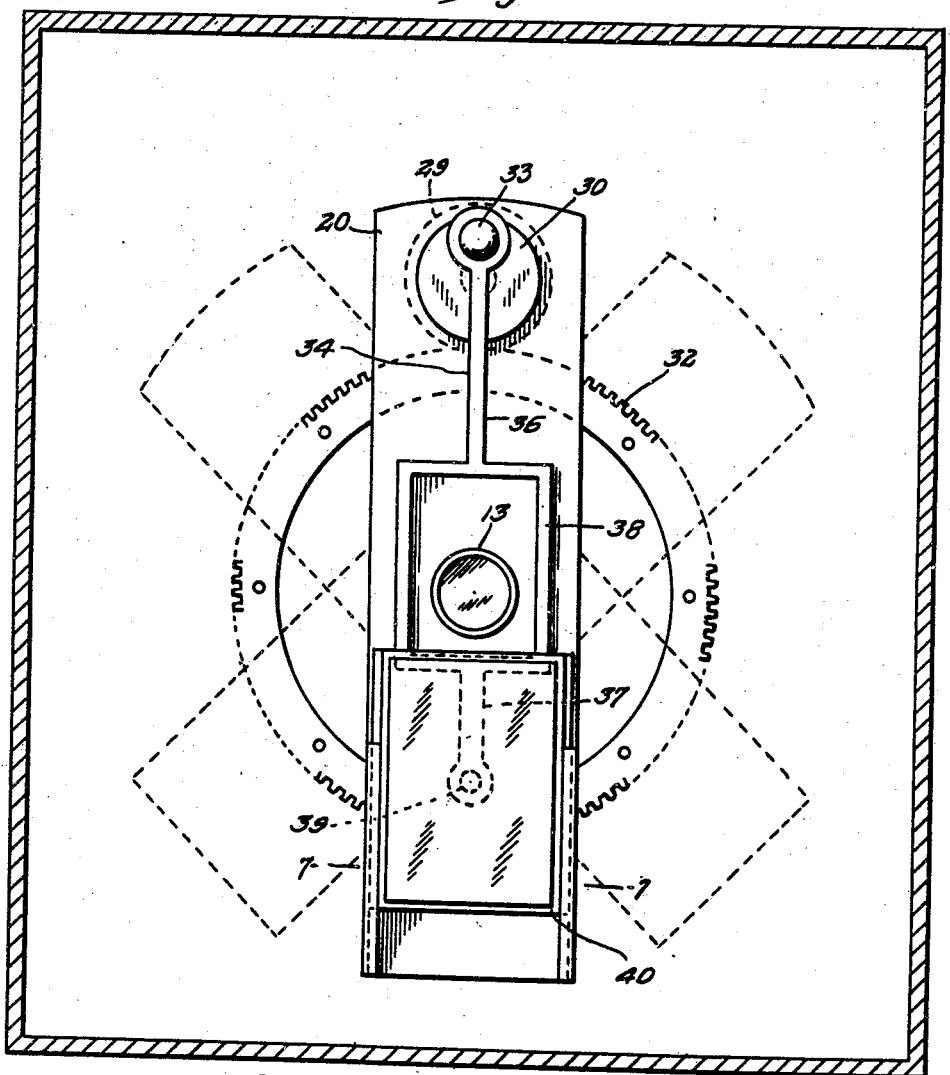
Figure 4 is a sectional elevational view, the section being taken along line 4—4 in Figure 2, the view showing mainly the means for moving one of the reflectors, the other reflector and the parts carrying it being removed.
Figure 7:
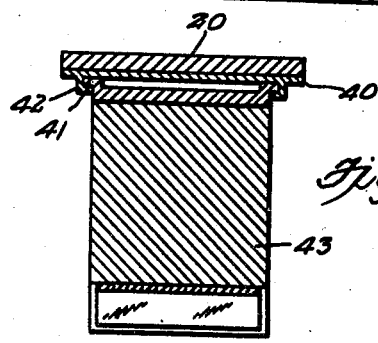
Figure 6:
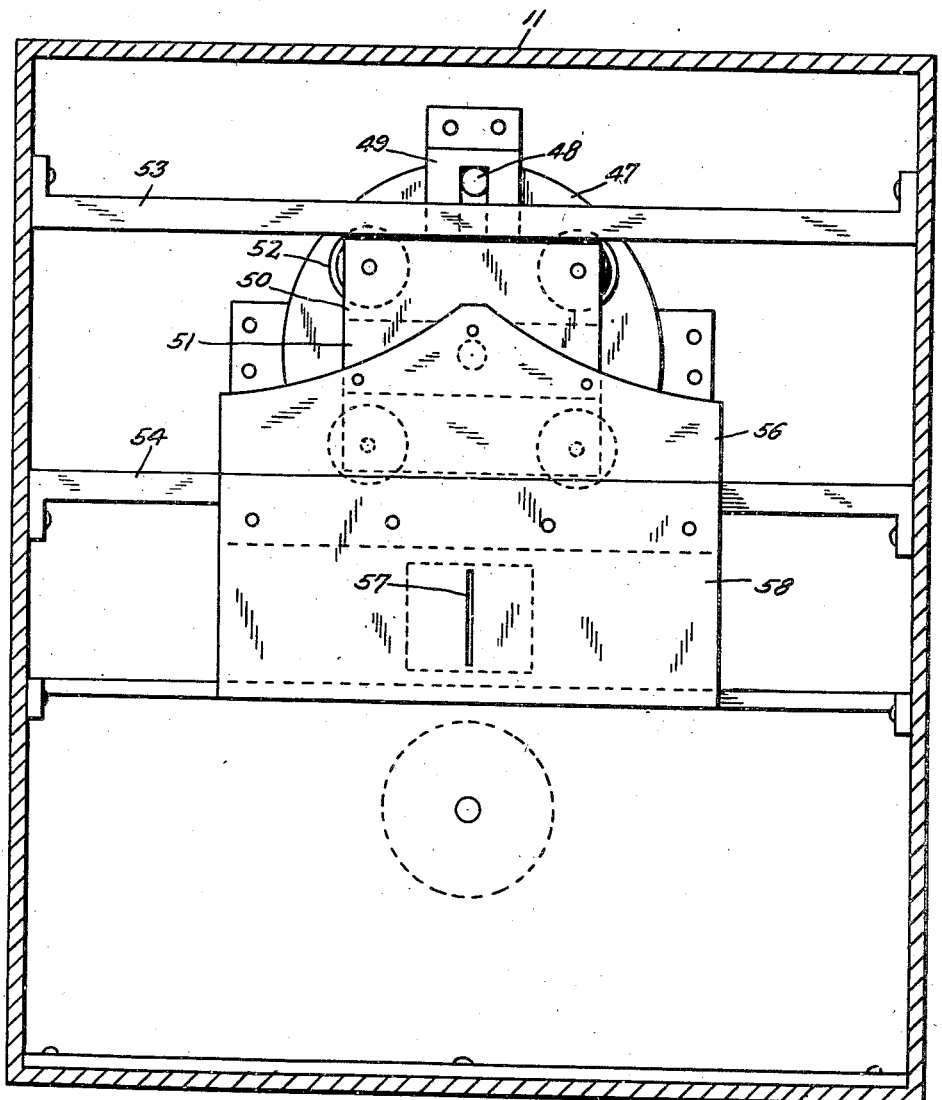
Figure 6 is a front view of the carriage for the shutter showing the means for reciprocating the latter.
Figure 8:
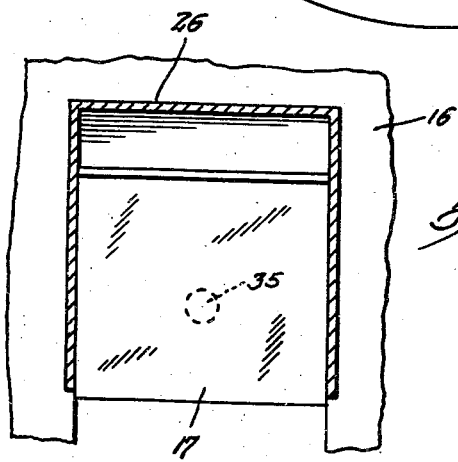

Figures 7 and 8 show details in section along the lines 7—7 of Figure 4 and 8—8 of Figure 2, respectively.

Figure 9:
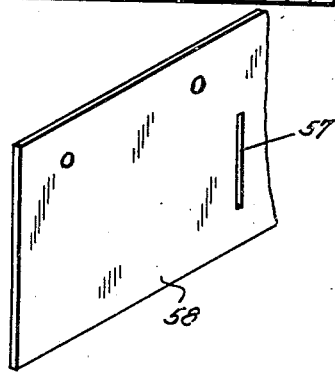

Figure 9 is a perspective view of the shutter plate with the linear slot, and

Figure 10:
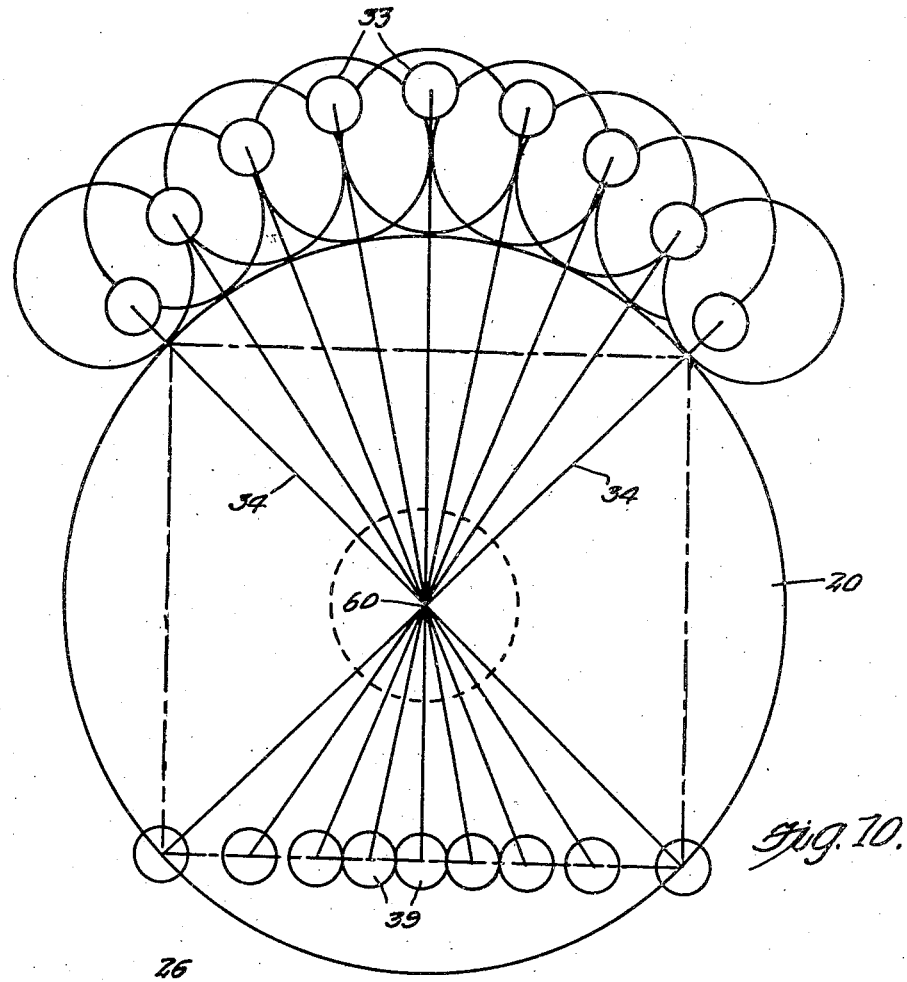

Figure 10 is a diagram illustrating the reflector movement during the active part of its rotational movement.

The method employed for producing stereoscopic effects is based on the principle—well known in itself—that when a view of an object is presented which shows a contour or outline as well as those faces which are running in the direction of vision of the spectator in the same way in which these lines or faces are seen when looked at with two eyes a marked stereoscopic effect is produced. Such a view when presented to a spectator is very similar to the picture familiar to him which is produced by merging the two pictures seen by the two eyes.

Figure 1:
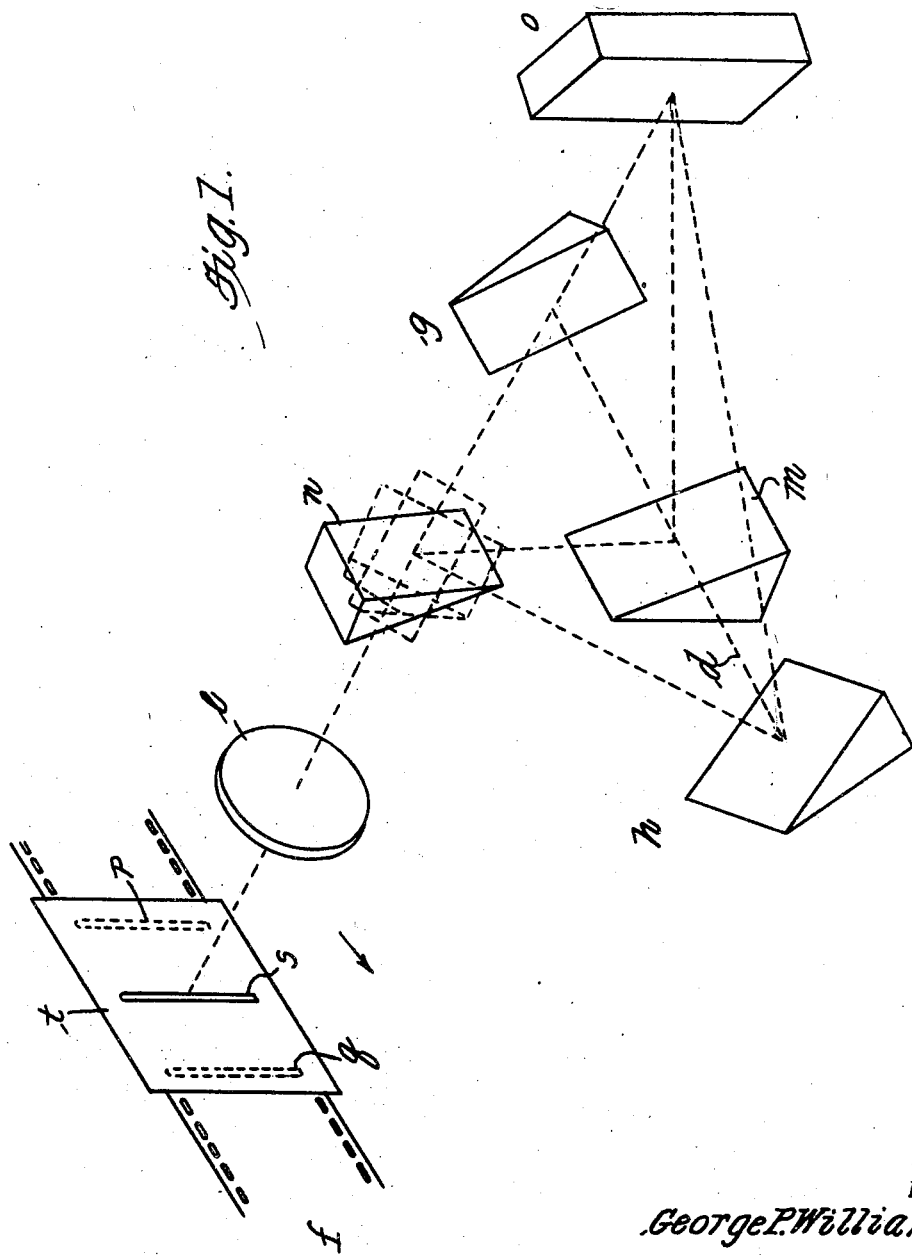
Figure 1 is a diagram illustrating the method used according to the invention.

In order to produce views of this type with a monocular optical system, the lens is not directly utilized to make an image of the picture but a movable reflector or mirror $m$ (Figure 1) is added to the optical system which is moved over a distance $d$ corresponding to or somewhat greater than the distance between the eyes and which by means to be described throws the image of the object $o$ permanently into the lens system $l$.

It is clear that the mirror $m$, when in its left-hand position $h$ (shown in dotted lines in Figure 1) will reflect a picture into the lens system $l$ which is somewhat different from that which is obtained by a reflection in the position $g$ on the right hand side. If the mirror were simply moved from left to right during the exposure the result would, however, not be satisfactory. For, although a view of the object would be produced such as above described, the shifting of the view point would also result in a representation of each point of the object $o$ on the exposed film $f$ by a short line rather than by a point. The result would be a blurred picture lacking in definition and very similar to a faulty picture made while the camera has been moved.

To eliminate this defect the picture according to the invention is built up line by line by drawing along the film $f$ (or along any other sensitized layer) a shutter $t$ having a linear longitudinal slot $s$ with a velocity which is proportional to the velocity with which the mirror $m$ is moved. When the mirror is shifted from the left toward the right (from position $h$ to position $g$ in Figure 1) the shutter $t$ carries the slot $s$ from right to left (from position $p$ to position $q$). Each position of the mirror, therefore, furnishes only a small linear picture. The complete picture consists of the aggregation of all these linear pictures and, while it retains the character of a perfectly defined picture made with a monocular lens system, it will also have the characteristics of a picture taken from a series of different viewpoints.

For instance both sides of planes running in a direction parallel to the optical axis of the lens system, which would present themselves merely as parallel lines in the usual monocular arrangement, will be seen as surfaces on the picture, thus producing the desired binocular or stereoscopic effect.

The method described, therefore, creates conditions which are ideal for the initiating of the mental process which will supply to the spectator viewing the picture the impression of looking into space or of looking on objects arranged one behind the other.

In order to throw the picture of the reciprocating mirror permanently into the optical system $l$ during the exposure a second mirror $n$ is arranged in the optical axis of the system $l$ and swings around said axis synchronously with the movement of the mirror $m$. Said mirror by means to be described later is at the same time turned around its axis so as to face mirror $n$ in every position. The two mirrors are thus maintained in a rigorous parallelism with the mirror $n$ in such position that the image of the object remains within the lens system $l$ during the entire stroke of mirror $m$.

It will be clear from the above explanation that the method for producing stereoscopic effects according to the present invention consists in building up a picture by means of a continuous series of linear or partial exposures, each exposure being taken from a different viewpoint. This method is carried out by taking the picture through the medium of a reciprocating reflector arranged in front of the lens and by making the exposure through a reciprocating linear slot in front of the film, both motions being timed so as to complete their strokes simultaneously.

The camera equipped for making pictures according to the method described is illustrated in Figures 2 to 9. It consists of a casing 11 containing all the various mechanisms. It is, however, to be understood that those appliances and mechanisms which are not part of the invention such as the diaphragm regulating the aperture, the mechanism for the focal adjustment of the lens and other mechanisms are omitted for the sake of clearness.

Within the casing a partition wall 12 is arranged, carrying the lens barrel 13 containing the optical system (not shown). Said lens barrel projects through the partition and is screwed on the other side into the box 14 at whose rear end the film 15 is arranged.

For the purpose of explanation it is assumed that the camera shown is one used for still pictures and not for movie pictures. It will, however, be clear that the method used is the same for both types of cameras and that the construction differs merely in the well known way for moving the film and in other respects which have no bearing on the present invention.

The movable reflector and mirror system is arranged in a special compartment 16 of the camera arranged in front of the lens system 13. It consists of two reflectors 17, 18 which are arranged in parallel planes to each other. The reflector 17 is arranged exactly opposite the optical system 13 of the camera with the optical and mechanical center in the optical axis of said system 13. The reflector 18 is arranged below and faces the opening 19 through which the light enters.

It has already been explained that the reflection from the reflector 18 in order to be permanently centered on the optical system has to be reflected by a rotatable reflector 17, while the reflector 18 has not only to reciprocate in order to change the viewpoint of the picture taken but also has to rotate around the optical axis of the lens system in order to remain in rigorous parallelism with the rotating mirror 17.

The movement of both mirrors is produced by means of the rotating plate 20 which is seated by means of a sleeve 21 forming its hub on the barrel 13 and in the partition wall 12; the latter houses a roller bearing (not shown) for this purpose. The rotating plate 20 is driven by a toothed wheel 22 keyed or otherwise fixed to the sleeve 21 of the plate and meshing with the gear wheel 23. The latter derives its motion from the shaft 24 on which a pulley is mounted which may be connected with any suitable source of power (not shown).

The rotating disk 20 by means of a U-shaped bracket 26 is connected with a support 27 carrying the mirror block 28 which serves as a base for the mirror 17. The support 27 is carried by a short shaft 35 journaled in the wall of the compartment 16 by means of roller or ball bearings (not shown). The plate 20 to which the support 27 is joined is thus journaled at two points arranged at a distance on the same axis and the very precise rotational movement around the optical axis of the lens system is thus secured. It is moreover clear that the optical center of the mirror 17 will always face the optical center of the lens system contained in barrel 13. The image appearing in the mirror 17 is thus permanently reflected through the lens system.

The rotating plate 20 moreover carries a stubshaft 31 on which a pinion 29 and a small rotating disk 30 are mounted. The pinion 29 meshes with a stationary toothed rim 32 fixed on the partition wall 12. During the rotation of the plate 20 said pinion 29 therefore rotates with a rotational speed corresponding to the ratio of the diameters and carries with it a small disk 30. On said disk a crank pin 33 is mounted which is attached to the link 34 moving the reflector 18. This link is provided with two arms 36, 37 connected by a frame 38 surrounding the lens barrel 13, and, at its lower end, it carries a pin 39 attached to the reflector base 40. The latter is provided with lateral ledges or flanges 41 sliding in corresponding grooves of a guide piece 42. On the reflector base 40 the reflector block 43 is mounted carrying the reflector 18 at the desired angle of inclination (preferably 45 degrees) relatively to the optical axis of the barrel. It is thus seen that the reflector 18 rotates with the rotating plate 20 and is reciprocated during such rotation by the link 34.

The device for partial or linear exposure of the film is mounted behind the partition wall 12. It is driven from the pulley 25 and shaft 24, the latter being journaled in the standard 45 and in the partition wall 12. By means of the two gear wheels 23 and 22 already mentioned, the gear wheel 44 is driven which is keyed to the shaft 46 carrying a flywheel 47. Said flywheel in its turn carries a crank pin 48 which cooperates with a slotted guide 49 mounted on a carriage 50.

The carriage consists of a body or frame 51 provided with four pairs of wheels or rollers 52 running on tracks 53, 54, fixed to the camera casing by means of flanges screwed to the side walls. Each track consists of a guiding rail into which two grooves with inclined surfaces are cut which receive similar tread surfaces on the rim of the wheels or rollers. The inclined surfaces of the wheels or rollers 52 together with the similarly shaped surface of the grooves 53, 54 while permitting free motion without noticeable friction in the desired direction, are enforcing a movement keeping rigorously within the prescribed straight line without lost motion which is most undesirable.

The body or base plate 51 of the carriage carries a shutter plate 56 which is provided with a narrow linear exposure slot 57 permitting only linear exposure at a time. The depending portion 58 of the plate carrying the slot 57 may be a separate member as shown in Figure 8; it covers the surface of the plate 15 which is held by the usual means (not shown) within the camera and is backed by a plate 59.

The operation of the camera will now be readily understood from the foregoing description. As regards the movement of the reflector 18 special reference is made to Figure 10 illustrating the movement.

When shaft 24 is driven by the pulley 25 the pinions 23 and 22 drive the rotating plate 20; the latter will rotate and will impart by this rotation a rotating motion to pinion 29, which meshes with the stationary toothed rim 32. It may be assumed that the stationary toothed rim 32 has a diameter of say four times that of pinion 29. Under this assumption the pinion will perform four revolutions during one revolution of plate 20. During one-fourth of the revolution of plate 20 the pin 33 on small disk 30 starting from, say, its lowermost position on said disk as shown in Figure 9, will successively occupy all the positions shown in the upper half of Figure 10 during one revolution of the plate 20; the center of the pin will move in a cycloidal curve as clearly shown in the figure.

This movement of pin 33 will entail a movement of the link 34 through 90 degrees (one-fourth of a revolution of the plate 20). The pin 39 at the end of the link 34 having to perform simultaneously a combined movement along a circle and along a cycloidal curve will perform a movement in a straight line according to well known geometrical principles, if dimensions are properly chosen. The optical center of the reflector 18 which is reciprocated by the above mentioned mechanism thus performs a straight line movement during one-fourth of the revolution. As this straight line movement has been obtained by means of a rotation around the center 60 the surface of the reflector 18 during its movement changes its position facing permanently said center. Only the fourth part of the revolution of the plate 20 which is illustrated in Figure 10 is the part which is utilized for throwing a picture on the film. The other three sections of the movement of the reflector 18 which are straight lines shown in dots and dashes in Figure 10 are not made use of.

During the period of time during which the reflector 18 performs a straight line movement shown in Figure 10 the reflector 17 turns around together with the plate 20 and as both reflectors turn around the center 60 the reflector 18 always turns its face toward the reflector 17. The image of the object reflected from reflector 18 will, therefore, always be thrown on the reflector 17 and from there into the opening of the lens.

During the movement of the reflector 18 the carriage is moved in exact coordination therewith.

Assuming the diameter of the toothed wheel 44 to be exactly twice the diameter of pinion 22 it is clear that during one revolution of the plate 20 flywheel 47 will accomplish one-half of its revolution and that, therefore, a complete revolution of the flywheel corresponds to two revolutions of plate 20. During one revolution of the flywheel te pin 48 reciprocates the carriage 51 and thereby carries the slot forth and back over the film surface. This motion being utilized to expose the film.

Exposure of the film occurs only during part of the reciprocating movement, the remainder being merely used to overrun the film edges. This gives sufficient time for changing the film between exposures.

As will be seen from Figure 2, the opening 19 is so arranged that light from the object is thrown on the reflector 18 merely during the straight line motion in the lower portion made during one-fourth of the revolution of the plate 20. During the remaining three-fourths of the revolution of the plate 20 the reflector 18 moves behind the front wall 16 and between it and mirror 17 the U-shaped bracket 26 is interposed so that no light is received during this time. However, instead of this arrangement or in addition to this arrangement the usual type of shutter synchronized with the motion of the plate and of the flywheel may also be used.

The movement of the reflector has the same effect which would be produced by moving the camera, and, therefore, the point of view of the camera changes constantly for a distance which is somewhat greater than the distance between the optical axis of the human eyes. To every position of the reflector a linear picture of the object corresponds and the finished picture is, therefore, built up of lines each taken from another viewpoint, a marked stereoscopic effect will result.

It is to be noted that, as the effect is gradually built up across the picture, exaggeration of the plastic effect by selecting the distance in excess of the distance between the human eye is permissible, the exact degree giving the best effect having to be determined by experience.

I claim:

1. In a camera adapted to produce stereoscopic effects inherent in the picture made, an optical system provided with a monocular lens system and a reflector system throwing an image of the object into the lens system, said reflector system comprising a reflector facing the object and a reflector facing the lens system, a shutter with a linear slot covering the surface to be exposed, means to move the reflector facing the object in a straight line during exposure and means to move the reflector facing the lens system so as to continuously face the first-named reflector during its movement throwing the image reflected therefrom into the lens system, and means to move the shutter with the linear exposure slot along the surface to be exposed with a speed corresponding to that of the reflector moving on a straight line.

2. In a camera for producing stereoscopic effects inherent in the pictures made, an optical system provided with a monocular lens system and a reflector throwing an image of the object into the lens system, a shutter with a linear slot covering the surface to be exposed, means to move the reflector along a straight line during the exposure, said means comprising a rotating plate, a rotating member on said plate, a link actuated by said member and a slide carrying the reflector, actuated by said link, and means to move the shutter with a linear exposure slot along the surface to be exposed with a speed corresponding to that of the horizontal travel of the reflector.

3. In a camera adapted to produce stereoscopic effects inherent in the picture made, an optical system provided with a monocular lens system and a reflector system throwing an image of the object into the lens system, said reflector system comprising a reflector facing the object and a reflector facing the lens system, a shutter with a linear slot covering the surface to be exposed, means to move the reflector facing the object in a straight line during exposure and means to move the reflector facing the lens system so as to continuously face the first-named reflector during its movement, said means comprising a rotating plate centered around the optical axis of the lens system, a rotatable member thereon, a link connected with said rotatable member, a stationary member rotating said rotatable member during the rotation of the plate, a support for the reflector facing the object connected with said link, a support for the reflector facing the lens, members fixed to said plate for connecting the last-named support with the rotating plate, and means to move the shutter with a linear exposure slot along the surface to be exposed with a speed corresponding to that of the horizontal travel of the reflector facing the object.

4. In a camera for producing stereoscopic effects inherent in the pictures made, an optical system provided with a monocular lens system and a reflector throwing an image of the object into the lens system, a shutter with a linear slot covering the surface to be exposed, means to move the reflector along a straight line and means comprising a rotating plate, a rotatable member on said plate, a link actuated by said member and a slide carrying the reflector, actuated by said link, means to move the shutter with the linear exposure slot along the surface to be exposed, comprising a carriage carrying the shutter plate, a rotatable member for reciprocating said carriage and gear members transmitting the rotational movement imparted to the rotating plate to the above-named rotatable member for reciprocating said carriage.

5. In a camera for producing stereoscopic effects inherent in the pictures made as specified in claim 4, a carriage consisting of a body plate provided with wheels, tracks for said wheels, running in a transverse direction across the camera, a shutter plate provided with a linear slot attached to said carriage body, a slotted guide attached to said body and a pin reciprocating within said guide and moving it transversely, said pin projecting from the rotatable member for reciprocating said carriage.

6. In a camera adapted to produce stereoscopic effects inherent in the pictures made, an optical system provided with a monocular lens system and a reflector system throwing an image of the object into the lens system, said reflector system comprising a reflector facing the object and a reflector facing the lens system, a shutter with a linear slot covering the surface to be exposed, means to move the reflector facing the object in a straight line during exposure and means to move the reflector facing the lens system so as to continuously face the first-named reflector during its movement, a closed compartment enclosing both reflectors with a straight transverse opening facing the first-named reflector, said compartment being arranged in front of the lens system, and means to move the shutter with a linear exposure slot along the surface to be exposed with a speed corresponding to that of the reflector.

7. In a camera for producing stereoscopic effects inherent in the pictures made as specified in claim 4, a carriage comprising pairs of twin wheels on each side, said wheels being provided with a tread consisting of surfaces inclined toward each other and a track provided with grooves with correspondingly inclined surfaces within which the wheels are moving.

8. A photographic method for obtaining stereoscopic effects on conventional films or plates provided with a conventional sensitized emulsion by means of a stationary camera, provided with a fixedly mounted lens system whose focal plane is coincident with the picture plane containing the sensitized layer and further provided with an image reflecting system including a movable reflector arranged between the object and the lens system, which consists in reciprocating the reflector in front of the object transversely to the optical axis of the lens system over a distance corresponding to that of the viewpoints of the stereoscopic picture, in reflecting the changing image of the object into the lens system during exposure, in projecting said changing picture by means of the fixed lens system onto the focal plane of the latter, in exposing an approximately strip-like, linear area of the sensitized layer at any given instant and in shifting the exposed linear area over the entire picture during exposure, with a speed equal to that of the moving reflector.

9. A stationary camera for producing stereoscopic effects inherent in the picture on conventional films or plates, provided with a conventional sensitized emulsion layer, comprising a fixed lens system, a reflecting mirror system, including a reflector arranged between said lens system and said object, means for reciprocating said reflector during exposure in a transverse direction in front of the object in a plane perpendicular to the optical axis of the lens system, means for projecting the rays reflected by said reflector permanently into the lens system during said exposure, a focal shutter provided with a linear slot, the latter arranged in a direction perpendicular to the direction of motion of the reflector and means for moving said linear slot over the entire area in a direction parallel to the direction of motion of the reflector and at a speed corresponding to the speed of the reflector.

GEORGE P. WILLIAMS.